May 10, 1949.
J. L. MROZINSKI
2,469,978
WIELDABLE IMPLEMENT SELF-RESTORING
TO CARRIED POSITION
Filed June 26, 1947
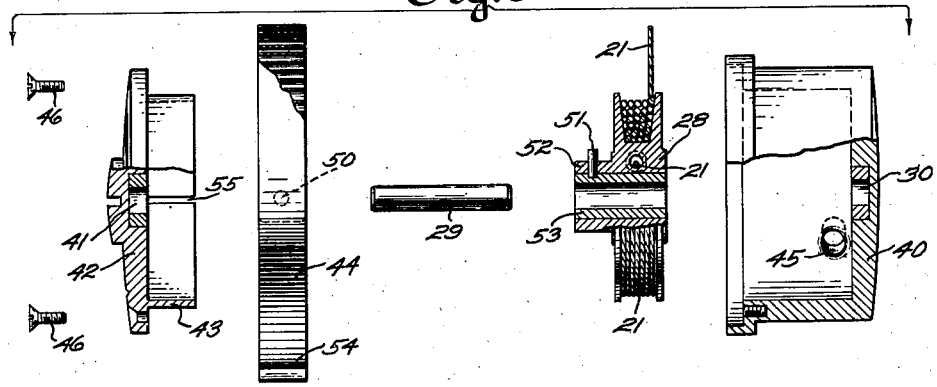
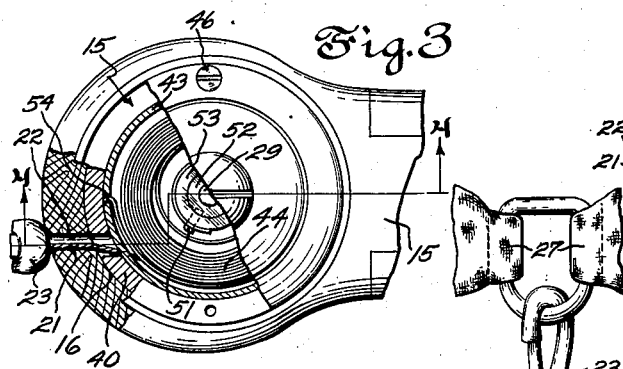
INVENTOR
John L. Mrozinski,
BY
ATTORNEY

Patented May 10, 1949

2,469,978

UNITED STATES PATENT OFFICE 2,469,978

WIELDABLE IMPLEMENT SELF-RESTORING TO CARRIED POSITION

John Leo Mrozinski, Danbury, Conn.

Application June 26, 1947, Serial No. 757,174

2 Claims. (Cl. 242—107)

1

This invention relates to improvements in carrying attachments for wieldable implements having an elongated graspable handle, such as hand nets used for landing fresh water game fish. Such handled implements need to hang snugly from the person of the user in a manner to facilitate carrying them when walking and yet require full freedom of movement in use as well as instant readiness to be grasped and wielded without interference by their means of attachment.

General objects of the invention are to make the fish net automatically self-restoring to the place of suspension in which it is normally carried idle on the person of the user, to unify automatic self-restoring mechanism with the aforesaid handle of the implement and to avoid all necessity for manual attention to the means of attachment of the implement to the wearer's clothing whether in using it to net a fish or for restoring it to its carried idle position.

It has been proposed heretofore to tie articles of wearing apparel to a person's clothing by an extensible line, cord or chain, but only as a guard against the article becoming permanently separated from the person of the wearer. Such formerly proposed attaching instrumentalities will not accomplish the above objectives.

The present improvements aim to provide an extensible line with take-up devices enabling it to be wound up automatically and stored on or within the frame handle of a fish landing net, or analogous wieldable implement, and further arranged to serve as a sole means of support for such implement so that as ordinarily carried when not in use the entire weight of the implement is suspended from such line.

Another object is to avoid tangling troubles caused by exposed loops of attachment cord or chain by eliminating all exposed length of same when the net is carried idle. Such elimination of tangling troubles is of great help to a fisherman who must carry and maneuver several items of equipment at the same time in connection with fly casting while wading a stream with insecure footing.

A related object is to avoid all necessity for auxiliary or secondary controls on the net handle for fastening a loss preventing attachment line to a net handle at different points in its length as for carrying the net idle at one time, and for free wielding use of the net at another time.

A particular object of these improvements is to incorporate automatic take-up mechanism remaining always at the end portion of the handle of the implement so that the attachment line may be played out and taken up automatically always from or toward the implement handle in a direction to avoid contact between the attachment line and the hand of the user while the net handle is in the grasp of and being maneuvered by the user's hand.

While the invention is illustrated herein as applied to a fish landing net, there are other and comparable implements that may incorporate in their structure an automatic take-up device for an extensible line featured by the principles of this invention. Among such are rackets used in various types of ball and bat games, policemen's night clubs, etc.

The foregoing and further objects of the invention will be apparent in greater detail from the following description of a preferred form of the invention which has reference to the appended drawings wherein:

Fig. 1 shows my improved net and its extensible suspension means in normal wearing position suspended from the clothing of a fisherman.

Fig. 2 is a view illustrating practical use of a fish landing net incorporating the present improvement.

Fig. 3 is a fragmentary view of the end portion of the net handle in approximately preferred actual size equipped with the automatic line take-up device of these improvements.

Fig. 4 is a sectional view taken on the plane 4—4 in Fig. 3, looking in the direction of the arrows.

Fig. 5 is an exploded view of the mechanical parts of the take-up unit removed from the net handle.

Fig. 6 shows a typical manner of suspending the net from one of the equipment sling straps of the wearer.

In Figs. 1 and 2 there is shown, respectively idle and in use, a hand wielded net 12 for landing fresh water game fish incorporating the present invention. It comprises the usual open mesh netted bag 13 depending from a frame 14 of looping shape with which the handle 15 for wielding it is rigid as in conventional constructions. Handle 15 comprises an elongated shank of sufficient girth substantially to fill the hollow of a user's hand when grasped in a manner to dispose the end of the shank near the user's wrist as shown in Fig. 2.

This end portion of handle 15 is slightly bulged in width and is bored crosswise or may merely be recessed at 16 to receive and fixedly contain devices designated 20 as a whole in Figs. 3 and 4 operative to restore the implement automatically to any suitable place of suspension on the person of a user illustrated in Fig. 1. A flexible line, cord or chain 21 is arranged to run in either direction through a guiding aperture 22 in the terminus of handle 15. The outer end of this line has affixed thereto a suitable spring clip 23 which may be of conventional type for quick detachable fastening to any convenient point on the garb or equipment usually worn by a fisherman, such as a trousers belt or the sling strap 27. Clip 23 may as readily be hooked over the edge of a jacket pocket or into the buttonhole of a coat lapel, if preferred.

When line 21 is so fastened on the person of the user, net 12 is designed to be supported solely by the automatic up-pull of the line 21 which draws the net handle somewhat tightly against the attachment clip 23 so that no appreciable length of free line is exposed therebetween. This makes for more steady carrying of the net than would be the case if the net were to swing from even a small free length of suspension line which would permit the net undesirable freedom to dangle and flop about.

For the purpose indicated practically the whole length of line 21 is windable on a take-up wheel here shown in the form of a pulley 28 that is free to rotate relatively to the net handle about a pivotal support in fixed relation to the latter. Such support is herein represented by a removable central pivot spindle 29. One end of this spindle seats in the hardened bearing socket 30 which is embedded in the cross wall of a casing cup 40 tightly lodged in the handle bore or recess 16. The other end of spindle 29 seats in a hardened bearing socket 41 in the cross wall of a removable cover cap 42 whose annular flange 43 fits snugly into cup 40 and also forms a retaining barrel for the coiled band spring 44. The sockets 30 and 41, as well as bearing bushing 53, are preferably made as separate parts in order to permit the casing cup 40 and its cover 42 to be turned, molded or die cast from softer materials than would afford durable rotary bearing for spindle 29. The side wall of cup 40 contains a flared aperture 45 which registers with handle aperture 22 to permit passing of line 21 freely therethrough.

The inner end of spring 44 contains an attachment hole 50 which hooks over a removable anchor pin 51 that is tight in the hub 52 of reel 28. Pin 51 also serves to fasten the bearing bushing 53 rotatively to hub 52. The outer end of spring 44 is bent over at 54 and hooks into an anchorage slot 55 in the flange 43. Cover 42 is held removably on casing cup 40 by screws 46. Spring 44 is made sufficiently yielding to permit the easy play out of line 21 to at least the extent of arm's length as indicated in Fig. 2, and yet it urges wheel 28 counterclockwise, or in line take up direction in Fig. 3, with sufficient force when the user lets go of the net handle to lift the fish net in unison with wheel 28 and its pivotal support means 29, 40, 42, etc. into their position shown in Figs. 1 and 6 and hold them suspended there instantly ready for manual grasping and free maneuvering when the net is next made use of.

The principles underlying these improvements will be recognized as concerned with the idea of arranging the pivotal support structure for the take-up wheel to be united with and fixed against separation from the net handle from the end of whose shank the attachment line trails. While this might otherwise be accomplished by flexibly coupling the take-up unit in non-separable relation to the fish net handle, I prefer to make the pivotal support structure for the take-up wheel rigid with the handle of the implement as herein shown. Many modifications such as the above will be suggested by this disclosure to others skilled in the art because the principles underlying the invention may be embodied in parts shaped and disposed to differ from the exact practical form of the improvements herein proposed. Hence the appended claims are directed to and intended to cover all obvious substitutes and equivalents for the particular parts illustrated and described which are embraced within the most inclusive meaning of the claim language.

I claim:

1. In a wieldable implement including a handle, in combination, a reel, means rotatably mounting said reel in the handle of said implement, said handle being of sufficient length to position its inner end adjacent the wrist of the user when said implement is in use, a spring, means connecting said spring to said reel, a flexible line wound on said reel, means for guiding said line so that it leaves said handle at the outer end thereof adjacent the wrist of the user, and means for connecting said line to a user, said implement being supported in a rest position on a user by said line, said line unwinding from and turning said reel to tension said spring as said implement is moved by the user away from the point of connection of said line to the user, said spring having sufficient strength to rewind said line and return said implement to its rest position on the user when said implement is released by the user.

2. In a wieldable implement including a handle, in combination, a reel, means rotatably mounting said reel in the handle of said implement, the axis of said reel being transverse to the longitudinal axis of said handle, said handle being of sufficient length to position its inner end adjacent the wrist of the user when said implement is in use, a coil spring, a cover including an annular flange, said spring being concentrically positioned within said flange, said flange supporting said spring when said spring is not under tension, means anchoring the outer end of said spring to said flange, means anchoring the inner end of said spring to said reel, a flexible line wound on said reel, means for guiding said line so that it leaves said handle at the outer end thereof adjacent the wrist of the user, and means for connecting said line to a user, said implement being supported in a rest position on a user by said line, said line unwinding from and turning said reel to tension said spring as said implement is moved by the user away from the point of connection of said line to the user, said spring having sufficient strength to rewind said line and return said implement to its rest position on the user when said implement is released by the user.

JOHN LEO MROZINSKI.

REFERENCES CITED

The following references are of record in the file of this patent:

UNITED STATES PATENTS

| Number | Name | Date |
| --- | --- | --- |
| 166,099 | Hastings | July 27, 1875 |
| 1,545,312 | Dolan | July 7, 1925 |
| 1,736,624 | Richardson | Nov. 19, 1929 |
| 1,779,349 | Whatley | Oct. 21, 1930 |
| 2,003,893 | LaPan | June 4, 1935 |